(12) United States Patent
Deking et al.

(10) Patent No.: US 8,725,777 B2
(45) Date of Patent: May 13, 2014

(54) OBJECT RECOGNITION AND LOCALIZATION SERVICE USING RFID

(75) Inventors: Alois Ludwig Deking, Aying (DE);
Prakash Iyer, San Jose, CA (US);
Ravikanth Srinivasa Pappu, Cambridge, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/475,945

(22) Filed: May 19, 2012

(65) Prior Publication Data

US 2013/0311519 A1 Nov. 21, 2013

(51) Int. Cl.
*G06F 17/30* (2006.01)

(52) U.S. Cl.
CPC ............................... *G06F 17/30017* (2013.01)
USPC ........................................................ 707/803

(58) Field of Classification Search
USPC ................................. 707/770, 803, 822, 825
See application file for complete search history.

(56) References Cited

U.S. PATENT DOCUMENTS

| | | | |
|---|---|---|---|
| 7,606,741 B2 | 10/2009 | King et al. | |
| 7,747,655 B2 | 6/2010 | Hull et al. | |
| 7,760,969 B2 | 7/2010 | Silverbrook et al. | |
| 7,762,453 B2 | 7/2010 | Lapstun et al. | |
| 7,775,440 B2 | 8/2010 | Silverbrook et al. | |
| 7,793,824 B2 | 9/2010 | Lapstun et al. | |
| 7,818,215 B2 | 10/2010 | King et al. | |
| 7,821,507 B2 | 10/2010 | Lapstun et al. | |
| 7,855,811 B2 | 12/2010 | Silverbrook et al. | |
| 7,861,169 B2 | 12/2010 | Hull et al. | |
| 7,971,784 B2 | 7/2011 | Lapstun et al. | |
| 8,028,894 B2 | 10/2011 | Lapstun et al. | |
| 2005/0010409 A1* | 1/2005 | Hull et al. | ......... 704/243 |
| 2013/0241698 A1* | 9/2013 | Rasmussen | ......... 340/10.1 |

OTHER PUBLICATIONS

Phimmasean et al., A Multi-Channel MAC Protocol for RFID Reader Networks, 2008, IEEE, 769-772.*

* cited by examiner

*Primary Examiner* — Jean B Fleurantin
(74) *Attorney, Agent, or Firm* — Boris G. Tankhilevich (57) ABSTRACT

A method of creating and managing a database of meta_data sets for a plurality of objects is provided. The meta-data set is configured to characterize an object. The meta_data set for a "j"-object is selected from the group consisting of: a first item; a second item; an "i"-th item; and ID-j tag; wherein "i" and "j" being integers. The method comprises: (A) identifying a meta_data set for at least one object; (B) collecting a meta_data set for at least one object; (C) creating the database of meta_data sets for the plurality of objects; (D) storing the database of meta_data sets for the plurality of objects; and (E) accessing the database of meta_data sets for the plurality of objects.

19 Claims, 3 Drawing Sheets

OBJECT RECOGNITION AND LOCALIZATION SERVICE USING RFID

TECHNICAL FIELD

The technology relates to the utilization of radio-frequency identification (RFID) tags, and more specifically, to the usage of RFID for object recognition and localization services.

BACKGROUND

People are storing lots of valuable tools and equipment in their basements, shacks and attics. After a couple of months/years they lose track and don't remember where they have put the tool or it is even forgotten, that it exists at all. This is true for professional companies as well as private households.

What is needed is to combine RFID technology and additional data of customer property and manage the resultant data so as to provide improved functionality for management and control of their goods and tools. Customers are everyday consumers with their household goods (all their tools and goods in their basement) as well as professional users, which will benefit from the additional functionality for better control over their property, tools, and inventory.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of creating and managing a database of meta_data sets for a plurality of objects is provided. The meta-data set is configured to characterize an object. The plurality of objects can be enumerated by using an index "j", wherein "j" is an integer equal or greater than 1. Thus, any object can be identified as a "j"-object, without specifying its particular nature. The meta_data set for a "j"-object is selected from the group consisting of: a first item; a second item; an "i"-th item; and ID-j tag; wherein "i" is an integer equal or greater than.

The method comprises: (A) identifying a meta-data set for at least one object; (B) collecting a meta-data set for at least one object; (C) creating the database of meta-data sets for the plurality of objects; (D) storing the database of meta-data sets for the plurality of objects; and (E) accessing the database of meta-data sets for the plurality of objects.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
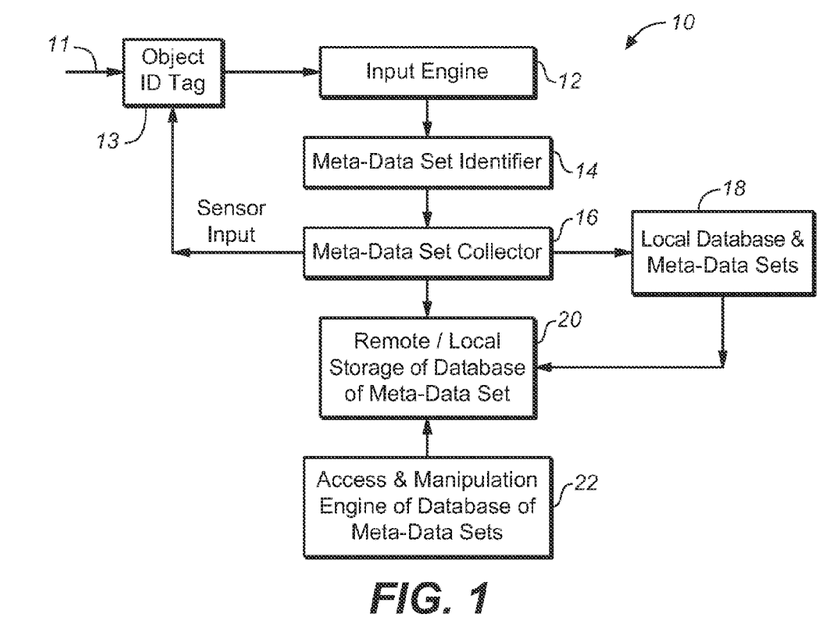
FIG. 1 illustrates a block diagram of an apparatus for creating and managing a database of meta-data sets for a plurality of objects for the purposes of the present technology.

In an embodiment of the present technology, FIG. 1 illustrates the block diagram 10 of an apparatus for creating and managing a database of meta-data sets for a plurality of objects 11 for the purposes of the present technology.

In an embodiment of the present technology, at least one object 11 is characterized by a meta-data set comprising a plurality of items selected from the group consisting of: a 2-D picture of an object; position coordinates of location of the object; a material of which the object has been made; an explicit functional value of the object; an implicit functional value of the object; a purpose of the object; a brand of the object; an age of the object; weight of the object; and dimensions of the object.

Customers with a large variety of tools kept in shops or in trucks, or in the field, may benefit from having an online database of the tools, along with various ancillary types of data. This online database can contain much more than just the name and model of the tool, making the database extremely useful in terms of obtaining updates, determining warranty periods, consulting on uses of a specific tool, etc.

Example I

The customer takes a picture of the object he wants to archive and track location in the future (alternately he could also scan the bar-code, or write a description) and puts an RFID tag on it. He uploads the picture/information to a "Trimble object recognition service", along with the unique ID of this RFID tag. The service identifies the type of object (e.g. by pattern matching with pictures in the Internet), sends this information back to the customer's database. From then on the customer can add his own information about the object into the database (initial price, time of purchase, etc.). Also he can locate the object easily with a detector device, when it has been misplaced.

In an embodiment of the present technology, a special Object Recognition Engine can be used to provide an integrated platform for the Asset Management & Visibility. Please, see the detailed disclosure below.

As it is disclosed below in more details, the Object Recognition Engine utilizes a summarized language of Identities to automate the recognition function. Indeed, an object can have a plurality of identities including, but not limited to,: (a) Visual identity—including brand identity etc. that can be looked up using visual recognition; (b) Electronic identity—Barcodes, RFID, tags, QR codes that needs either local or remote recognizers; (c) Engineering identity—drawings, an Application Program, Interface; a source code, accessories, data sheets, application notes etc. that can be looked up; (d) Material identity—what this object is made of.

Referring still to FIG. 1, in an embodiment of the present technology, the input engine 12 provides to the meta-data set identifier 14 all items that are relevant to the object 11.

In an embodiment of the present technology, the input engine 12 is implemented by using a data input device selected from the group consisting of: a laptop computer; a netbook; and a smart phone.

In an embodiment of the present technology, the meta-data set identifier 14 is configured to store all items of the meta-data set that are relevant to the object 11.

In an embodiment of the present technology, the meta-data set identifier 14 is implemented by using a memory storage device selected from the group consisting of: a memory stick; a laptop computer; a netbook; and a smart phone.

In an embodiment of the present technology, the meta-data set identifier 14 transmits to the meta-data set collector 16 all items that are relevant to the object 11.

Figure 2:
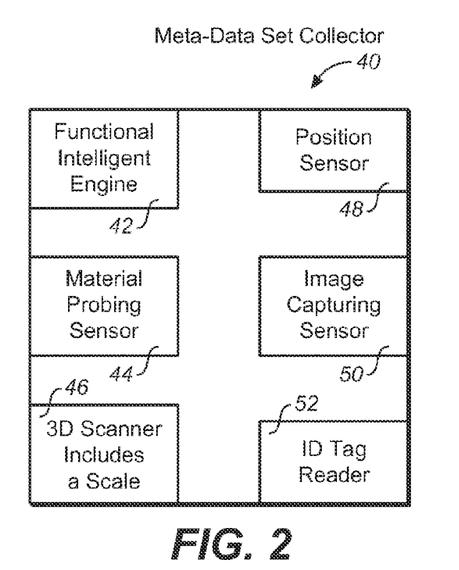
FIG. 2 is a block diagram of a meta-data set collector including a plurality of sensors for the purposes of the present technology.

As it is shown in FIG. 2, in an embodiment of the present technology, the meta-data set collector 40 comprises a plurality of sensors that are used to determine each item relevant to the object 11.

In an embodiment of the present technology, at least one item relevant to object 11 comprises a 3-D picture of the object 11.

In an embodiment of the present technology, the image-capturing sensor 50 (of FIG. 2) is used to capture 3-D picture of the object 11.

In an embodiment of the present technology, the image-capturing sensor 50 (of FIG. 2) configured to capture the 3-D picture of the object 11 is selected from the group consisting of: a digital camera; a digital video camera; a digital camcorder; a stereo digital camera; a stereo video camera; a motion picture camera; a television camera; and a non-photometric 3D scanner.

In an embodiment of the present technology still video and digital cameras store the images in a solid-state memory, or on magnetic media or optical disks.

In an embodiment of the present technology, the image-capturing sensor 50 further comprises a stereo digital camera. A stereo camera is a type of camera with two or more lenses. This allows the camera to simulate binocular vision, and therefore gives it the ability to capture three-dimensional images, a process known as stereo photography. Stereo cameras may be used for making stereo views and 3D pictures for movies, or for range imaging. 3-D Images Ltd., located in UK, produces a 3-D Digital Stereo camera—a fully automatic, time synchronized, digital stereo camera. Point Grey Research Inc., located in Canada produces binoculars or multiple array cameras that can provide full field of view 3 D measurements ion an unstructured environment.

In an embodiment of the present technology, the image-capturing sensor 50 further comprises a non-photometric 3D scanner 46. 3D scanner is a device that analyzes a real-world object or environment to collect data on its shape and possibly its appearance (i.e. color). The collected data can then be used to construct digital, three dimensional models.

Many different technologies can be used to build these 3D scanning devices; each technology comes with its own limitations, advantages and costs. Many limitations in the kind of objects that can be digitized are still present, for example, optical technologies encounter many difficulties with shiny, mirroring or transparent objects. Collected 3D data is useful for a wide variety of applications. These devices are used extensively by the entertainment industry in the production of movies and video games. Other common applications of this technology include industrial design, orthotics and prosthetics, reverse engineering and prototyping, quality control/inspection and documentation of cultural artifacts.

In an embodiment of the present technology, at least one item relevant to object 11 comprises a 2-D picture of the object 11. In an embodiment of the present technology, the image-capturing sensor 50 (of FIG. 2) is used to capture a 2-D picture of the object 11.

In an embodiment of the present technology, the image-capturing sensor 50 (of FIG. 2) configured to capture the 2-D picture of the object 11 is selected from the group consisting of: a digital camera; a digital video camera; a digital camcorder; a motion picture camera; a television camera; and a non-photometric 2D scanner. (Please see the discussion above).

In an embodiment of the present technology, at least one item relevant to object 11 comprises position coordinates of the object 11.

In an embodiment of the present technology, the position sensor 48 (of FIG. 2) is used to obtain position coordinates of the object 11.

In an embodiment of the present technology, the position sensor 48 (of FIG. 2) configured to obtain position coordinates of the object 11 is selected from the group consisting of: a radio-based position sensor; an image-capturing position sensor; a laser sensor; and a contact and proximity sensor.

In an embodiment of the present technology, the radio-based position sensor 48 (of FIG. 2) configured to obtain position coordinates of the object 11 is implemented by using a Trimble Total Station (not shown) to determine precise position coordinates of the object 11.

In an embodiment of the present technology, the position sensor 48 (of FIG. 2) configured to obtain position coordinates of the object 11 is implemented by using a range measuring device (not shown) selected from the group consisting of: a point laser beam; a sonar; a radar; and a laser scanner.

In an embodiment of the present technology, a point laser beam range measuring device can be implemented by using blue solid-state lasers, red diode lasers, IR lasers which maybe continuously illuminated lasers, or pulsed lasers, or sequenced lasers.

In an embodiment of the present technology, a laser scanner range measuring device can be implemented by using positioning sensors offered by Sensor Intelligence website www.sick.com. For instance, the Laser Scanner Model Name S10B-9011DA having compact housing and robust IP 65 design may be used. This laser scanner has the following data sheet: dimensions: (W×H×D)=102×152×105 mm, the scan angle of 270°, and the switching field range of 10 meters. It has the following functionality: a stand-by mode, a 7-segment input display, an integrated parameter memory in-system, a plug CANopen interface, and low energy consumption.

In an embodiment of the present technology, a sonar range measuring device can be implemented by using active sonar including sound transmitter and a receiver.

Active sonar creates a pulse of sound, often called a "ping", and then listens for reflections (echo) of the pulse. This pulse of sound is generally created electronically using a sonar projector consisting of a signal generator, power amplifier and electro-acoustic transducer/array, possibly with a beam former. To measure the distance to the object 11 the time from transmission of a pulse to reception is measured and converted into a range by knowing the speed of sound. The pulse may be at constant frequency or a chirp of changing frequency (to allow pulse compression on reception). Pulse compression can be achieved by using digital correlation techniques.

In an embodiment of the present technology, a radar range measuring device (not shown) can be implemented by using a transmitter that emits either microwaves or radio waves that are reflected by the scene (not shown) and detected by a receiver, typically in the same location as the transmitter.

In an embodiment of the present technology, at least one item relevant to object 11 comprises material of which the object 11 has been made.

In an embodiment of the present technology, the material probing sensor 44 (of FIG. 2) is used to determine the material of which the object 11 has been made.

In an embodiment of the present technology, the material probing sensor 44 (of FIG. 2) is selected from the group consisting of: a probe material analyzer; a bio organic sensor; a bio inorganic sensor; a nano organic sensor; a nano inorganic sensor; a micro-electrochemical sensor; a bio-electrochemical sensor; and an integrated analytical system.

Probe Material Analyzer manufactured by Chemsultants International, Inc., located in Mentor, Ohio 44060 can be used as a versatile and user-friendly testing device. The ChemInstruments Probe Material Analyzer is configured to characterize a variety of materials through the insertion, dwell and retraction of custom probe sensors. Those materials include viscoelastic polymers, adhesives and compounds. Data management is made easier with the included EZ-Lab software.

A biosensor is an analytical device that can convert a biological reaction into an electrical (voltage) signal. Biosensors consist of a biological element (e.g. enzyme, whole cell, etc.) that is immobilized on a membrane and connected to a transducer (probe). The reaction occurs at the membrane where the substrate of interest is converted to a product that causes an electrical response. This response is measured by the transducer and then amplified, processed and displayed using a meter and PowerLab data acquisition system. The PowerLab is a high-performance data acquisition unit capable of recording at speeds of up to 400,000 samples per second continuously to disk (aggregate). PowerLab units are compatible with instruments, signal conditioners and transducers supplied by ADInstruments, as well as many other third-party companies. In addition to standard single-ended BNC inputs, 4 differential Pod ports are also available for direct connection of Pod signal conditioners and appropriate transducers. Research PowerLab is manufactured by ADInstruments, Inc., Colorado Springs, Colo. 80906.

The Nanochemistry and Nanoengineering group from the University of Dayton Research Institute located in Dayton, Ohio, has developed numerous bio sensors.

A XYZ-on-a-chip MEMS Fuel Sensor is a portable all-in-one functional sensor for combat in-field fuel testing for specific hydrocarbon content, oxygen, water, conductivity, etc.

Opto-Chemical Sensors is a CdS nanoparticle-based thin film for opto-chemical sensor applications. Opto-chemical sensing is based on the unique ability of nanostructured semiconductors to alter their optical response in the presence of a "recognition element," the chemical adsorbent on the surface. Such sensors can be calibrated for detection of specific chemicals, including toxic species in both liquids and gases.

Nanobiomagnetic Sensors utilize functionalized magnetic nanoparticles.

A variety of electrochemical sensors are being used extensively in many stationary and portable applications. Electrochemical sensors operate by reacting with the gas of interest and producing an electrical signal proportional to the gas concentration. A typical electrochemical sensor consists of a sensing electrode (or working electrode), and a counter electrode separated by a thin layer of electrolyte.

Sandia National Laboratories research team has developed an electrochemical sensor that uses a unique surface chemistry to reliably and accurately detect thousands of differing biomolecules on a single platform.

The University of Texas at Austin has developed a self-powered micro electrochemical sensor in which pressure-driven flow alone (no external electrical energy) can be used to drive faradaic electrochemical reactions.

Referring still to FIG. 1, in an embodiment of the present technology, at least one item relevant to object 11 comprises a purpose of the object 11.

In an embodiment of the present technology, the purpose of the object 11 could be entered manually by an owner of object 11 at the time the local database of meta-data sets 18 has been created.

In an embodiment of the present technology, the purpose of the object 11 could be recovered from the inventory records.

Referring still to FIG. 1, in an embodiment of the present technology, at least one item relevant to object 11 comprises a brand of the object 11.

In an embodiment of the present technology, the brand of the object 11 could be entered manually by an owner of object 11 at the time the local database of meta-data sets 18 has been created.

In an embodiment of the present technology, the brand of the object 11 could be recovered from the inventory records.

Referring still to FIG. 1, in an embodiment of the present technology, at least one item relevant to object 11 comprises an age of the object 11.

In an embodiment of the present technology, the age of the object 11 could be entered manually by an owner of object 11 at the time the local database of meta-data sets 18 has been created.

In an embodiment of the present technology, the age of the object 11 is relevant for the purposes of evaluating the value of the object.

Referring still to FIG. 1, in an embodiment of the present technology, at least one item relevant to object 11 comprises the weight of the object 11.

In an embodiment of the present technology, the weight of the object 11 could be entered manually by an owner of object 11 at the time the local database of meta-data sets 18 has been created.

In an embodiment of the present technology, the weight of the object 11 could be recovered from the inventory records.

Referring still to FIG. 1, in an embodiment of the present technology, at least one item relevant to object 11 comprises the dimensions of the object 11.

In an embodiment of the present technology, the dimensions of the object 11 could be entered manually by an owner of object 11 at the time the local database of meta-data sets 18 has been created.

In an embodiment of the present technology, the dimensions of the object 11 could be recovered from the inventory records.

Referring still to FIG. 1, in an embodiment of the present technology, at least one item relevant to object 11 comprises the explicit (objective) functional value of the object 11.

In an embodiment of the present technology, the explicit (objective) functional value of the object 11 could be entered manually by an owner of object 11 at the time the local database of meta-data sets 18 has been created.

In an embodiment of the present technology, the explicit functional value of the object 11 could be recovered from the inventory records.

In an embodiment of the present technology, the explicit functional value of the object 11 could be determined by using the functional intelligent engine 42 of FIG. 2.

Referring still to FIG. 1, in an embodiment of the present technology, at least one item relevant to object 11 comprises the implicit (subjective) functional value of the object 11.

In an embodiment of the present technology, the implicit (subjective) functional value of the object 11 could be entered manually by an owner of object 11 at the time the local database of meta-data sets 18 has been created.

In an embodiment of the present technology, the implicit functional value of the object 11 could be determined by using the functional intelligent engine 42 of FIG. 2.

Referring still to FIG. 1, in an embodiment of the present technology, the object 11 is identified by an ID tag 13 attached to it.

Referring still to FIG. 1, in an embodiment of the present technology, the ID tag 13 is selected from the group consisting of: a quick response code (QR code) attached to the object; an RFID tag; a low power RFID tag; a barcode; an infra-red tag; and an ultra sound tag.

QR Code (abbreviated from quick response code) is the trademark for a type of matrix barcode (or two-dimensional code) first designed for the automotive industry. More recently, the system has become popular outside of the industry due to its fast readability and large storage capacity compared to standard UPC barcodes. The code consists of black modules arranged in a square pattern on a white background. The information encoded can be made up of four standardized kinds ("modes") of data (numeric, alphanumeric, byte/binary, Kanji), or through supported extensions, virtually any kind of data. Invented by the Toyota subsidiary Denso Wave in 1994 to track vehicles during the manufacturing process, the QR Code is one of the most popular types of two-dimensional barcodes. It was designed to allow its contents to be decoded at high speed.

Formerly confined to industrial uses, they have in recent years become common in consumer advertising and packaging, because the dissemination of smartphones "has put a barcode reader in everyone's pocket" for the first time. As a result, the QR code has become a focus of advertising strategy, since it provides quick and effortless access to the brand's website. Beyond mere convenience to the consumer, the importance of this capability is that it increases the conversion rate (that is, increase the chance that contact with the advertisement will convert to a sale), by coaxing qualified prospects further down the conversion funnel without any delay or effort, bringing the viewer to the advertiser's site immediately, where a longer and more targeted sales pitch may continue.

Referring still to FIG. 1, in an embodiment of the present technology, the ID tag 13 can be implemented by using Radio-frequency identification (RFID) technology that uses communication through the use of radio waves to exchange data between a reader and an electronic tag attached to an object, for the purpose of identification and tracking.

It is possible in the near future, RFID technology will continue to proliferate in our daily lives the way that bar code technology did over the forty years leading up to the turn of the 21st century bringing unobtrusive but remarkable changes when it was new.

RFID makes it possible to give each product in a grocery store its own unique identifying number, to provide assets, people, work in process, medical devices etc. all with individual unique identifiers—like the license plate on a car but for every item in the world. This is a vast improvement over paper and pencil tracking or bar code tracking that has been used since the 1970s. With bar codes, it is only possible to identify the brand and type of package in a grocery store, for instance.

Furthermore, passive RFID tags (those without a battery) can be read if passed within close enough proximity to an RFID reader. It is not necessary to "show" them to it, as with a bar code. In other words it does not require line of sight to "see" an RFID tag, the tag can be read inside a case, carton, box or other container, and unlike barcodes RFID tags can be read hundreds at a time. Bar codes can only read one at a time.

Some RFID tags can be read from several meters away and beyond the line of sight of the reader. The application of bulk reading enables an almost simultaneous reading of tags.

Radio-frequency identification involves the hardware known as interrogators (also known as readers), and tags (also known as labels), as well as RFID software or RFID middleware. The novel RFID tags are selected from the group including, but not limited to, a High Frequency (HF) RFID tag; and an Ultra High Frequency (UHF) RFID tag, Ultra-Wideband (UWB) tags, and Chipless RFID tags.

Most RFID tags 13 contain at least two parts: one is an integrated circuit for storing and processing information, modulating and demodulating a radio-frequency (RF) signal, and other specialized functions; the other is an antenna (not shown) for receiving and transmitting the RF signal.

RFID can be either passive (using no battery), active (with an on-board battery that always broadcasts or beacons its signal) or battery assisted passive "BAP" which has a small battery on board that is activated when in the presence of an RFID reader. Passive tags in 2011 start at $0.05 each and for special tags meant to be mounted on metal, or withstand gamma sterilization go up to $5. Active tags for tracking containers, medical assets, or monitoring environmental conditions in data centers all start at $50 and can go up over $100 each. BAP tags are in the $3-10 range and also have sensor capability like temperature and humidity.

In an embodiment of the present technology, the ID tag 13 is implemented by using a combination of an RFID tag and an infra-red tag. The combination of active RFID tags and infra-red technology enables the system to work in data environment that have both open and closed Data Generation Devices. In this scenario, the short range of infrared signal is an advantage.

In an embodiment of the present technology, the ID tag 13 is implemented by using an ultra sound tag.

For example, the PC-Detector from Sonitor Technologies uses ultrasound indoor positioning and real time location systems (RTLS) technology to automatically track the real time location of patients and moveable hospital equipment. The RTLS solution makes the Sonitor ultrasound tag signal detectable by computers not already equipped with the hardware and sound processing capabilities that are required to pinpoint indoor positioning system tags. By leveraging existing computer hardware and LAN connectivity, mobile computing systems such as tablet PCs, computer/medication carts, and other point-of-care devices can track the tags with reliable 100 percent room-level and bed-level location accuracy. Sonitor Technologies Inc. is located in Largo, Fla.

Referring still to FIG. 1, in an embodiment of the present technology, the ID tag 13 includes an externally readable code selected from the group consisting of: a radio code transmitted on a specific frequency, a radio code transmitted on a specific frequency periodically, a radio code transmitted on a specific frequency aperiodically, an infrared code, an infrared code transmitted on a specific frequency periodically, an infrared code transmitted on a specific frequency aperiodically, an ultrasound transmitted on a specific frequency, an ultrasound transmitted on a specific frequency periodically, and an ultrasound transmitted on a specific frequency aperiodically.

Referring to FIG. 2, in an embodiment of the present technology, the Meta-data set collector 40 includes an ID tag reader 52.

Referring still to FIG. 1, in an embodiment of the present technology, the ID tag reader 52 (of FIG. 2) is selected from the group consisting of: an RFID tag reader, an Infrared tag reader, and an Ultra Sound tag reader.

In an embodiment of the present technology the RFID reader 52 can be implemented by using ThingMagic® Mercury 6 (M6) 4-port, multiprotocol RFID reader.

Depending on mobility, RFID readers 52 are classified into two different types: fixed RFID and mobile RFID. If the reader reads tags in a stationary position, it is called fixed RFID. These fixed readers are set up specific interrogation zones and create a "bubble" of RF energy that can be tightly controlled if the physics is well-engineered. This allows a very definitive reading area for when tags go in and out of the interrogation zone.

In an embodiment of the present technology, if ID tag 13 is implemented by using a passive RFID tag 13 (without a battery), it can be read if passed within close enough proximity to the RFID reader 52. It is not necessary to "show" them to it, as with a bar code. In other words it does not require line of sight to "see" an RFID tag, the tag can be read inside a case, carton, box or other container, and unlike barcodes RFID tags can be read hundreds at a time. Bar codes can only read one at a time.

Some RFID tags 13 can be read from several meters away and beyond the line of sight of the reader. The application of bulk reading enables an almost simultaneous reading of tags.

In an embodiment of the present technology, the Infra-Red (IR) tag reader 52 can be implemented by using tag return signal generation using a light source to return a signal from the IR tag 13 to the tag reader 52. A modulated light signal could be produced by turning on and off a small infrared LED using short current pulses.

In an embodiment of the present technology, the Infra-Red (IR) tag reader 52 can be implemented by using a light shutter to modulate the light striking the IR tag reader 52. Some ferroelectric devices, which require low power and behave like liquid crystal displays, could be placed in front of a plastic corner cube type reflective surface. A corner cube reflector has the unique property that it will send light back to the source in a parallel path. Such reflectors are often used on street signs, bicycle reflectors and on reflective clothing. When the ferroelectric device is turned on, light would be allowed to pass through the device and would then bounce off the reflective material, sending the light back to the source. When the ferroelectric device is turned off, light would not reach the reflective material and would therefore be adsorbed. Some ferroelectric devices have been used for high speed video displays so they could allow high data rates. Texas Instruments also has perfected arrays of tiny mirrors that can be moved using electrostatic methods to produce a light modulator. The beauty of the optical reflective method is that the level of light reflected back to a reader would be proportional to the amount of light striking the OPID tag. The approach might allow the tag read range to be extended to hundreds of feet or perhaps even 1 miles.

In an embodiment of the present technology, the Ultra Sound tag reader 52 can be implemented by using Sonitor's ultrasound technology.

In an embodiment of the present technology, referring still to FIG. 1, the local database of meta-data sets 18 is created by using the meta-data set collector 16.

In an embodiment of the present technology, referring still to FIG. 1, the local/remote storage database of meta-data sets 20 is created by using the meta-data set collector 16. The storage database 20 is remotely located on the rented web server and is configured to keep the local database 18 records for an indefinite time period.

Figure 3:
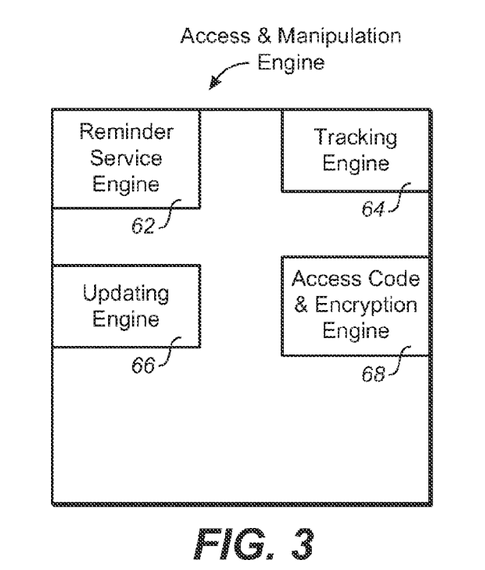
FIG. 3 depicts a block diagram of an access and manipulation engine configured to access a database of meta-data sets for a plurality of objects to provide service related to at least one object for the purposes of the present technology.

In an embodiment of the present technology, referring still to FIG. 1, the Local Database of meta-data sets 18 (and/or the Remote/Local Storage Database 20) is periodically updated by using the Updating Engine (shown as block 66 in FIG. 3) and implemented by the meta-data set Collector 16.

In an embodiment of the present technology, referring still to FIG. 1, the meta-data set Collector 16 can be implemented by using a wireless communication device selected from the group consisting of: a laptop; a netbook; a smartphone which is equipped with a wireless local communications system; a tablet; and a general wireless communication device having a display.

In an embodiment of the present technology, referring still to FIG. 1, the Local Database 18 can be implemented by using a device selected from the group consisting of: a laptop; a netbook; a smartphone, which is equipped with a wireless local communications system; a tablet; and a general wireless communication device having a display.

In an embodiment of the present technology, referring still to FIG. 1, the Remote/Local Storage Database of meta-data sets 20 can be implemented by using a remote server.

In an embodiment of the present technology, referring still to FIG. 1, the Access & Manipulation Engine 22 can be utilized to perform a number of functions related to the Local Database of meta-data sets 18 (and/or Remote/Local Storage Database of meta-data sets 20).

In an embodiment of the present technology, referring still to FIG. 1, the Access & Manipulation Engine 22 can be implemented by using a device selected from the group consisting of: a laptop, a netbook, a smartphone equipped with a wireless local communication system; a tablet; and a special purpose portable devices with a display.

In an embodiment of the present technology, referring to FIG. 1, more specifically, the Access & Manipulation Engine 22 can be utilized as a Tracking Engine 64 (of FIG. 3) to perform tracking of at least one object 11 in the Local Database of meta-data sets 18 and/or in the Remote/Local Storage Database of meta-data sets 20.

In an embodiment of the present technology, referring still to FIG. 1, more specifically, the Access & Manipulation Engine 22 can be utilized as a Reminder Service Engine 62 (of FIG. 3) to provide a reminder service for at least one object 11 in the Local Database of meta-data sets 18 (and/or in the Remote/Local Storage Database of meta-data sets 20).

In an embodiment of the present technology, the reminder service is selected from the group consisting of: expiration of warranty reminder for a selected object; service intervals reminder for a selected object; and factory call-backs reminder for a selected object.

In an embodiment of the present technology, referring still to FIG. 1, more specifically, the Access & Manipulation Engine 22 can be utilized as the Access code & Encryption Engine 68 (of FIG. 3) to provide and encrypt an access code to the Local Database of meta-data sets 18 (and/or to the Remote/Local Storage Database of meta-data sets 20.

Figure 4:
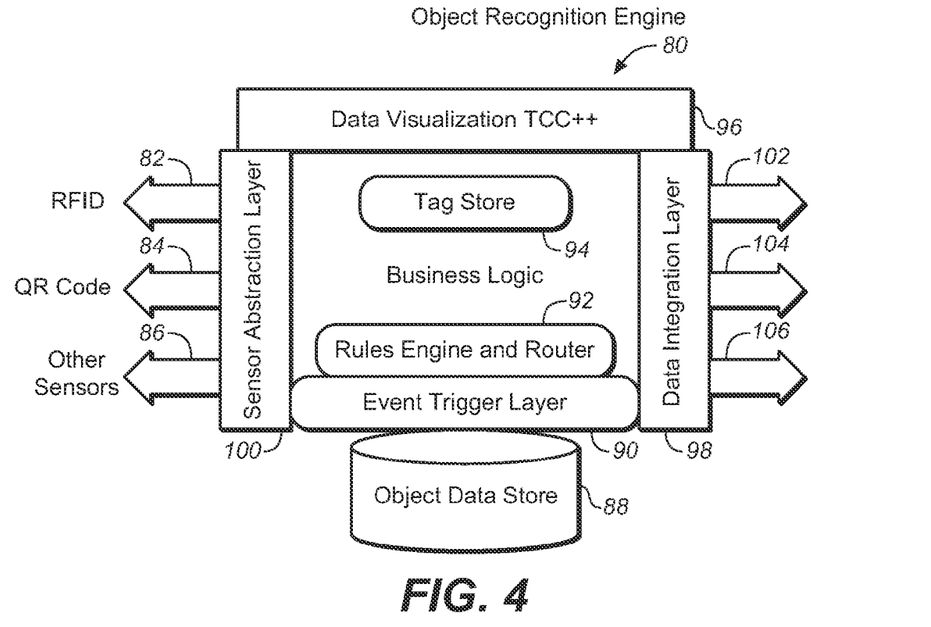
FIG. 4 is a block diagram of an object recognition engine for the purposes of the present technology.

In an embodiment of the present technology, FIG. 4 illustrates an Object Recognition Engine 80 that provides an integrated platform for the Asset Management & Visibility.

In an embodiment of the present technology, the Object Recognition Engine 80 of FIG. 4 utilizes a summarized language of Identities to automate the recognition function. Indeed, an object can have many identities including: (a) Visual identity—including brand identity etc. that can be looked up using visual recognition; (b) Electronic identity—Barcodes, RFID, tags, QR codes that needs either local or remote recognizers; (c) Engineering identity—drawings, an Application Program, Interface; a source code, accessories, data sheets, application notes etc. that can be looked up; (d) Material identity—what this object is made of.

In an embodiment of the present technology, more specifically, the Object Recognition Engine 80 of FIG. 4 uses inputs from RFID tag 82, from QR code 84, and from other sensors 86 to the sensor abstraction layer 100.

In an embodiment of the present technology, the data visualization layer 96 uses a generic visualization component (for example, an enhancement to the Trimble Connected Community software) to process the data from the sensor abstraction layer 100.

In an embodiment of the present technology, the data integration layer 98 uses the inputs from the data visualization layer 96, the tag store 94, from Rules Engine and Router 92, and from Event Trigger layer 90 to create the Object data store 88 (database of meta-data sets 18 of FIG. 1). The outputs 102, 104, 106 represent the responses to the data requests from the customers.

Figure 5:
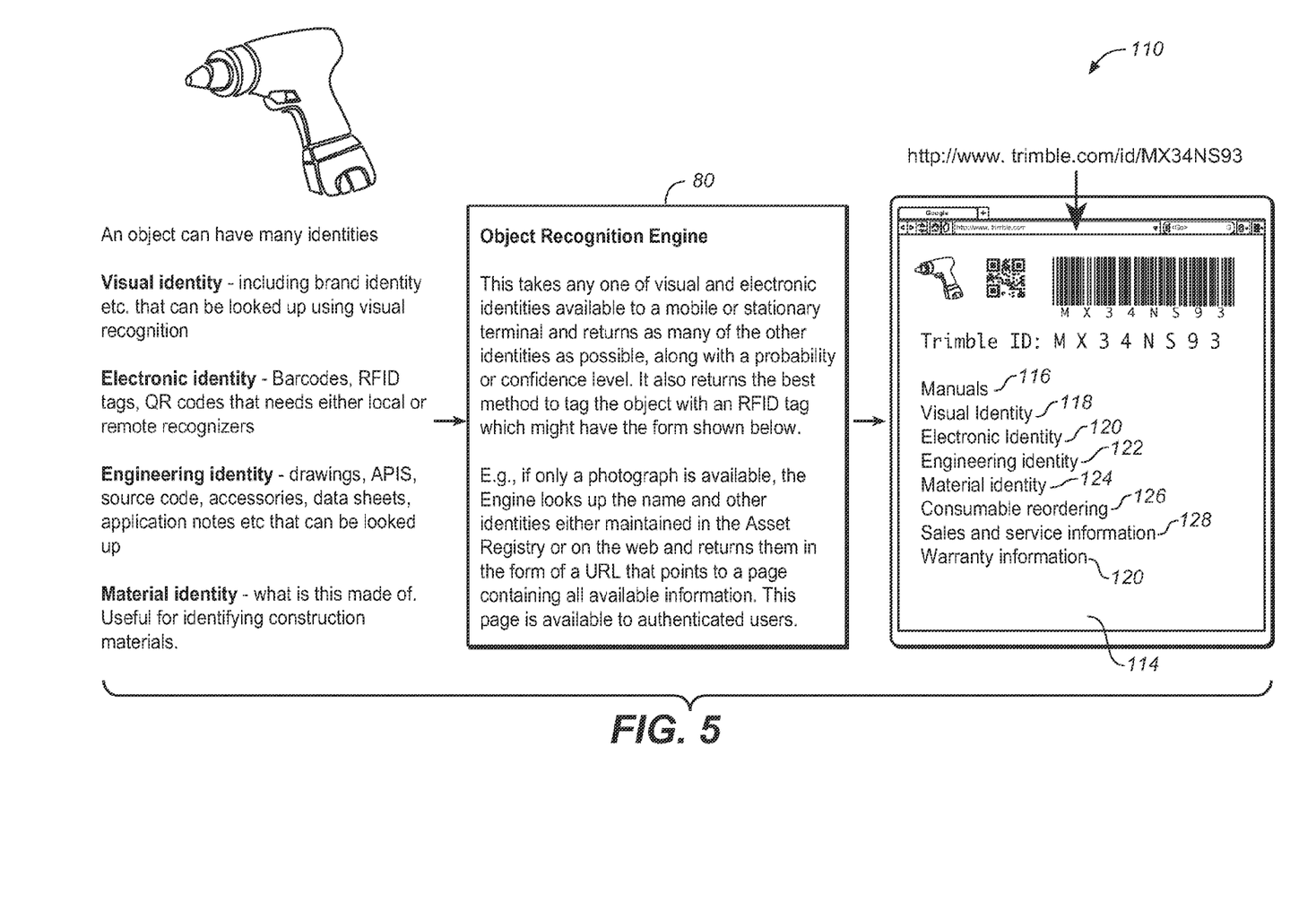
FIG. 5 illustrates the functioning of an object recognition engine for the purposes of the present technology.

In an embodiment of the present technology, FIG. 5 illustrates the diagram 110 that explains the functioning of the Object Recognition Engine 80 (of FIG. 4) in more details.

In an embodiment of the present technology, the functioning diagram 110 of FIG. 5 of the Object Recognition Engine 80 (of FIG. 4) takes any one of visual and electronic identities available to the mobile (or stationary, e.g. scanner station at a toll shop) terminal (not shown) and returns as many of other identities as possible, along with a probability or confidence level. It also returns the best method to tag the object with an RFID tag which might have the form shown at the block 114 of FIG. 5.

In an embodiment of the present technology, the Trimble ID: M X 3 4 N S 9 3 http://www.trimble.com/id/MX34NS93 could provide the following information about the object: Manuals 116, Visual Identity 118, Electronic Identity 120, Engineering identity 122, Material identity 124, Consumable reordering 124, Sales and service information 126, and Warranty information 120.

In an embodiment of the present technology, for example, if only a photograph is available, the Object Recognition Engine 80 (of FIG. 4) looks up the name and other identities either maintained in an Object Registry or on the Internet and returns them in the form of a URL that points to a page containing all available information. This page is available to authenticated users.

Figure 6:
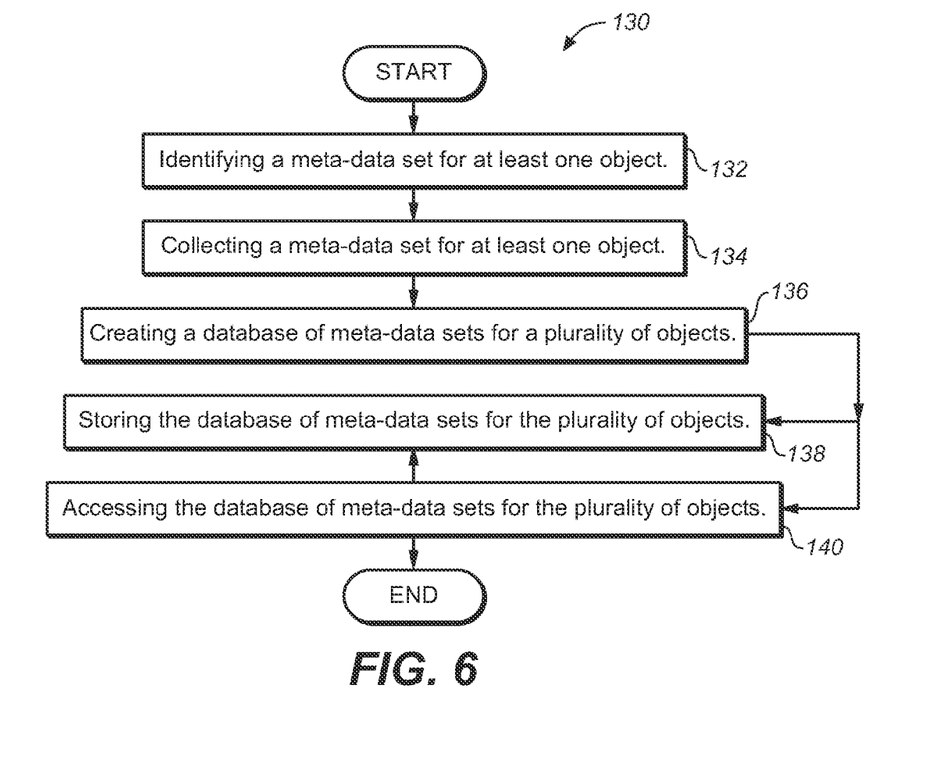
FIG. 6 is a flow chart of a method for creating and managing a database of meta-data sets for a plurality of objects for the purposes of the present technology.

In an embodiment of the present technology, FIG. 6 illustrates a flow chart 130 of the method of creating and managing a database of meta-data sets for a plurality of objects using the apparatus 10 of FIG. 1.

At the step 132 of FIG. 6, the meta-data set for the object 11 is identified by using the meta-data set identified 14 of FIG. 1.

At the step 134 of FIG. 6; all identified items of the meta-data set and the ID tag for the object 11 are collected by using the plurality of sensors (42, 44, 46, 42, and 50 of FIG. 2) and the ID tag reader 52 (of FIG. 2).

At the step 136 of FIG. 6, the Local database 18 is created by using the meta-data sets obtained in the step 134 for each object.

At the step 138 of FIG. 6, the Local database 18 is stored in the Remote rented server 20.

At the step 140 of FIG. 6, the Local database 18 and/or the Remote Database 20 are accessed by using the Access & Manipulation Engine 22 by providing a valid access code to an authorized customer.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for creating and managing a database of meta-data sets for a plurality of objects performed by at least one processor comprising:

(A) at least one identity sensor configured to identify a meta-data set for at least one object; said meta-data set is configured to characterize a "j"-object;

said meta-data set selected from the group consisting of: a first item; a second item; an "i"-th item; and ID-j tag; "i" and "j" being integers;

(B) at least one sensor configured to locate at least one "j"-object in said identified meta-data set;

(C) at least one sensor configured to collect a meta-data set for said at least one identified and located object; and (D) a computer means configured to create said database of meta-data sets for said plurality of objects;

wherein said identity sensor (A) further comprises: (A1) an ID tag attached to at least one said object;

wherein said ID tag is selected from the group consisting of: a quick response code (QR code) attached to said object; an RFID tag; a low power RFID tag; a barcode; and an infra-red tag; and an ultra sound tag.

2. The apparatus of claim 1 further comprising:

(E) a computer storage means configured to store said database of meta-data sets for said plurality of objects.

3. The apparatus of claim 2, wherein said computer means (E) further comprises:

(E1) an access code to said database of meta-data sets for said plurality of objects.

4. The apparatus of claim 1 further comprising:

(F) a computer means configured to access said database of meta-data sets for said plurality of objects.

5. The apparatus of claim 1, wherein said meta-data set for at least one object further comprises:

(A2) a meta-data set of said object comprising a plurality of items; at least one said item selected from the group consisting of:

a 3-D picture of said object; a 2-D picture of said object; position coordinates of location of said object; a material of which said object has been made; an explicit functional value of said object; an implicit functional value of said object; a purpose of said object; a brand of said object; an age of said object; a weight of said object; and dimensions of said object.

6. The apparatus of claim 1, wherein said sensor (B) further comprises:

(B1) a position sensor configured to determine the position coordinates of said at least one object.

7. The apparatus of claim 6, wherein said sensor (B1) further comprises:

(B1, 1) at least one said position sensor selected from the group consisting of:

a radio-based position sensor; and an image-capturing position sensor.

8. The apparatus of claim 1, wherein said sensor (C) further comprises:

(C1) a plurality of sensors configured to collect a meta-data set for at least one said object.

9. The apparatus of claim 8, wherein said sensor (C1) further comprises:

(C1, 1) at least one said sensor selected from the group consisting of:

an ID tag reader; an image-capturing sensor; a material probing sensor; a 3-D scanner including a scale; and an intelligent engine.

10. The apparatus of claim 8, wherein said sensor (C1) further comprises:

(C1, 2) at least one said sensor selected from the group consisting of:

a radio transmitter/receiver RFID tag reader; an optical transmitter/receiver bar code reader; an IR tag reader; and an ultra sound tag reader.

11. The apparatus of claim 8, wherein said sensor (C1) further comprises:

(C1, 3) at least one said sensor selected from the group consisting of:

a digital camera; a digital video camera; a digital camcorder; a stereo digital camera; a stereo video camera; a motion picture camera; a television camera; and a non-photometric 3-D scanner.

12. The apparatus of claim 8, wherein said sensor (C1) further comprises:

(C1, 4) at least one said sensor selected from the group consisting of:

a laser sensor; a contact and proximity sensor; and a magnetic resonance sensor.

13. The apparatus of claim 8, wherein said sensor (C1) further comprises:

(C1, 5) at least one said sensor selected from the group consisting of:

a probe material analyzer; a bio organic sensor; a bio inorganic sensor; a nano organic sensor; a nano inorganic sensor; a micro-electrochemical sensor; a bio-electrochemical sensor; and an integrated analytical system.

14. The apparatus of claim 8, wherein said sensor (C1) further comprises:

(C1, 6) a functional intelligent engine selected from the group consisting of:

a manual functional intelligent engine configured to assign an explicit functional value of said object; a manual functional intelligent engine configured to assign an implicit functional value of said object; an automatic functional intelligent engine configured to assign an explicit functional value of said object; and an automatic functional intelligent engine configured to assign an implicit functional value of said object.

15. The apparatus of claim 1, wherein computer means (D) further comprises:

(D1) a computer means configured to track at least one said object in said database of meta-data sets for said plurality of objects by using an access code.

16. The apparatus of claim 1, wherein said computer means (D) further comprises:

(D2) a computer means configured to provide a reminder service for at least one said object in said database of meta-data sets for said plurality of objects; wherein said reminder service is selected from the group consisting of:

expiration of warranty reminder for a selected object; service intervals reminder for a selected object; and factory call-backs reminder for a selected object.

17. A method of creating and managing a database of meta-data sets for a plurality of objects performed by at least one processor comprising:

(A) identifying a meta-data set for at least one object; said meta-data set is configured to characterize a "j"-object; said meta-data set selected from the group consisting of: a first item; a second item; an "i"-th item; and ID-j tag "i" and "j" being integers;

(B) at least one sensor configured, locating at least one said "j"-object identified in said identified meta-data set;

(C) collecting a meta-data set for said at least one identified and located object; and (D) creating said database of meta-data sets for said plurality of objects;

wherein said identity sensor (A) further comprises: (A1) an ID tag attached to at least one said object;

wherein said ID tag is selected from the group consisting of: a quick response code (QR code) attached to said object; an RFID tag; a low power RFID tag; a barcode; and an infra-red tag; and an ultra sound tag.

18. The method of claim 17 further comprising:
(E) storing said database of meta-data sets for said plurality of objects.

19. The method of claim 17 further comprising:
(F) accessing said database of meta-data sets for said plurality of objects.

\* \* \* \* \*